United States Patent [19]

Albert

[11] Patent Number: 5,233,486
[45] Date of Patent: Aug. 3, 1993

[54] METHOD FOR CORRECTING TRACK COUNTING ERRORS DURING SEEKS IN A HARD DISC DRIVE

[75] Inventor: Glenn D. Albert, Yukon, Okla.

[73] Assignee: Seagate Technology, Inc., Scotts Valley, Calif.

[21] Appl. No.: 711,460

[22] Filed: Jun. 6, 1991

[51] Int. Cl.⁵ .............................................. G11B 5/596
[52] U.S. Cl. ................... 360/77.04; 360/77.05; 360/77.07; 360/78.01; 360/75
[58] Field of Search ................. 360/27, 77.01, 77.02, 360/77.04, 77.05, 77.07, 77.08, 78.01, 75

[56] References Cited

U.S. PATENT DOCUMENTS

| | | | |
|---|---|---|---|
| 4,536,809 | 8/1985 | Sidman | 360/77.04 |
| 4,811,135 | 3/1989 | Janz | 360/77.05 |
| 4,860,131 | 8/1989 | Kowaguchi et al. | 360/78.01 |
| 4,878,136 | 10/1989 | Sarraf et al. | 360/78.04 |
| 4,967,292 | 10/1990 | Moteki | 360/78.13 |
| 5,164,867 | 11/1992 | Hagiwara | 360/77.05 |
| 5,168,398 | 12/1992 | Kanda et al. | 360/78.04 |

Primary Examiner—William L. Sikes
Assistant Examiner—Terry D. Cunningham
Attorney, Agent, or Firm—Edward P. Heller, III; Bill D. McCarthy; Louis W. Watson

[57] ABSTRACT

A method for correcting track counting errors during seeks of a servo head across the surface of a rotating disc of a hard disc drive. The number of tracks remaining in the seek is maintained in a tracks-to-go counter and the value in the counter is stored along with a plurality of previously stored counter values during each a sequence of equal time intervals. Potential track counting errors are detected by applying a first criterion to the stored counter values and first criterion is selected to yield false error detections for patterns of stored values satisfying a second criterion. For each potential track counting error, the second criterion is applied to the stored counter values and the tracks-to-go counter is incremented a selected number of times for patterns of stored values that do not satisfy the second criterion.

4 Claims, 4 Drawing Sheets ized to define a plurality of concentric data tracks along which are further defined a plurality of data sectors. Data files are then stored in specific sectors on specific tracks for recovery at a later time. Thus, the reading or writing of a particular file must be preceded by movement of a transducer head, by means of which the data is written or read, to the track that contains sectors assigned to that file. To this end, the drive contains a servo system that is generally comprised of a servo head that reads a servo pattern magnetically written to a surface, an actuator that moves the servo head across the surface, and circuitry that generates track crossing pulses as the head moves from one track to an adjacent track. These track crossing pulses are counted during seeks from one track to another to maintain a running log the location of servo head that will indicate when a target track has been reached.
METHOD FOR CORRECTING TRACK COUNTING ERRORS DURING SEEKS IN A HARD DISC DRIVE

BACKGROUND OF THE INVENTION

1. Field of the Invention

The present invention relates generally to improvements in hard disc drives, and, more particularly, but not by way of limitation to improvements in methods for effecting seeks of a servo head between servo tracks defined on the surface of a disc of the drive.

2. Brief Description of the Prior Art

In hard disc drives used for storing data generated by a computer, rotating discs having magnetizable surface coatings are formatted to define a plurality of concentric data tracks along which are further defined a plurality of data sectors. Data files are then stored in specific sectors on specific tracks for recovery at a later time. Thus, the reading or writing of a particular file must be preceded by movement of a transducer head, by means of which the data is written or read, to the track that contains sectors assigned to that file. To this end, the drive contains a servo system that is generally comprised of a servo head that reads a servo pattern magnetically written to a surface, an actuator that moves the servo head across the surface, and circuitry that generates track crossing pulses as the head moves from one track to an adjacent track. These track crossing pulses are counted during seeks from one track to another to maintain a running log the location of servo head that will indicate when a target track has been reached.

In hard disc drives having a relatively low track density and for which the maximum velocity attained by the servo head is relatively low, simple circuitry is adequate to maintain an accurate count of the tracks remaining in a seek. In particular, it has been found that a state machine that senses a series of states defined by relative magnitudes of signals induced in the servo head by passage of elements of the servo pattern and provides a track crossing pulse each time one of a selected set of state transitions occurs will suffice to maintain an accurate record of the location of the servo head. However, as servo head speeds and track densities have increased to meet demands for increased storage capacity and decreased track access time, difficulties have arisen. Noise in the signals induced in the servo head, imperfections in the surface coatings and other effects can cause a state transition to go undetected so that the track count becomes inaccurate. Unless corrected, this inaccuracy will cause the servo head to move beyond the target track so that it becomes necessary to determine that the head is not aligned with the desired track and perform additional seeks to bring the servo head to the target track. Both the determination and subsequent remedial action take time that vitiates the purpose for moving the servo head at higher velocities; that is, to decrease the time required to effect the movement of the servo head to the appropriate track.

For moderate servo head velocities, this problem can be solved by storing a sequence of track counts during a seek and incrementing the count each time a selected detection function defined on the track counts has a value below the range of values that such function will have during normal track seeking. In particular, an appropriate detection function is one which, in effect, provides the difference between the average velocity of the servo head as determined by recently stored track counts and the average velocity determined by previously stored track counts. Since the acceleration and deceleration of the servo head will lie within a predetermined range, the value of the function must also lie within a determinable range and missing track crossing pulses will shift the range to lower values because of a mis-calculation of the average velocity for the track counting intervals in which the missing track crossing pulses occur. Such approach is facilitated by the operation of the state machine to generate track crossing pulses for only selected state transitions so that missing track crossing pulses occur in groups. For example, in servo systems using the triphase servo pattern described in U.S. Pat. No. 4,811,135 issued Mar. 7, 1989 to Janz, the teachings of which are hereby incorporated by reference, the state machine can fail to generate track crossing pulses only in groups of three so that recently stored track counts during high speed movement of the servo head for which missing track crossing pulses occur will either be accurate or three less than the value that would have been stored had the track crossing pulses not been missed. Thus, when a group of track crossing pulses is not generated, the range of values of the detection function is shifted to a range that is lower than the normal range by the value three. For moderate maximum velocities of the servo head, requiring lower acceleration and deceleration of the head during seeks, the two ranges will not overlap so that the value of the detection function suffices to identify an error in the counting of track crossings during the seek.

With even higher velocities of the servo head, this approach to detecting and correcting for missing track crossing pulses breaks down. The higher velocities are achieved by increasing the acceleration and deceleration of the servo head during the seek so that the natural range of the detection function is expanded to cause overlap between the ranges for the case in which the track count is accurate and the case in which it is not. Moreover, the problem generally cannot be easily solved by merely changing the detection function to enhance the effect of the missing track crossing pulses. To do so would generally require the storage of additional track counts and excessive detection function evaluation time that would increase the time between storage of successive track counts. Not only can this increase in time extend the range of values of the detection function, so that the solution will exacerbate the problem, but it also gives rise to a second problem. Seeks are effected by accelerating and decelerating the servo head in proportion to the difference between the actual velocity of the servo head and a stored demand velocity profile and the values of the demand velocity are determined in relation to the track counts. Between storage of successive track counts the heads are accelerated or decelerated at a substantially constant rate, determined from the previous track count, so that overcontrol of the acceleration and deceleration of the head can occur. Such overcontrol can cause the velocity of the head to depart significantly from the demanded velocities to cause problems in the settling of the head on the target track. As a result, the detection function approach that has been described is generally operable only if the maximum velocity of the servo head is maintained at a low value that limits further decrease in the time required for seeks to be made.

SUMMARY OF THE INVENTION

The present invention solves this problem by adding a second step to the detection of missing track crossing pulses that need be carried out only in rarely occurring circumstances so that a detection function whose value can be determined in an acceptable time can be used to detect all but a few cases in which the track counts are indicative of the lack of counting errors. In such cases, a second check is performed, in one additional time required for the entry of a track count, so that the time required for adjusting the acceleration and deceleration of the servo head is maintained at a low value for all but a few track count entry periods to substantially eliminate settle problems that would otherwise arise if the track count entry period were increased. More specifically, the adjustment of the acceleration and deceleration of the head will occur at intervals of one track entry time which is made short to optimize control of the head movement during a seek at the cost of deleting one adjustment when the possibility of an error has occurred. Since the errors in counting track crossing pulses generally occur while the servo head is moving at high speed, subsequent adjustments of the servo head acceleration or deceleration will eliminate any effect on the time for the seek that one additional track entry period in the adjustment of the acceleration of deceleration of the head might have. Thus, the method of the present invention enables the servo head to be moved at higher velocities during seeks between tracks to consequently enable a minimization of seek times.

To this end, the invention exploits the relative rate of occurrence of values in the range of values for the detection function. In general, most of these values are concentrated in the center of the range so that only rarely will the lower extreme occur if the state machine has not missed a set of state transitions. Moreover, it has been found that the values of the track counts which will yield this extreme, in the absence of counting errors, can be readily identified by patterns of differences in successive track counts so that a secondary check for these patterns will identify cases in which no track crossings have been missed but the detection relation will have the lower extreme value of its range.

Accordingly, the present invention contemplates that track count difference patterns that correspond to the lower extreme of a selected detection function that can be rapidly evaluated will be predetermined and stored in a look-up table of a microcomputer of which the servo system is comprised during manufacture of the hard disc drive. In subsequent operation of the drive in which a seek is performed, the track count stored in a tracks-to-go counter will be stored at each of a succession of equal time intervals and maintained in storage for a time equal to a multiple of this interval to maintain a plurality of successive track counts for each time interval. During each interval, the value of the detection function is determined and the method proceeds to the storage of the track count for the next time interval if the value of the detection function is greater than the minimum that such function can have if no counting error has occurred. Should such value be the minimum of the range of normal values for such function, the pattern of track count differences is determined in an additional time interval and compared to the list of stored patterns. If such pattern matches a stored pattern, a return to the entry of track counts is effected. If not, the count of tracks remaining in the seek is incremented a number of time sufficient to correct for nondetection of a group of state transitions and a return to track count entry is thereafter effected.

An object of the present invention is to provide a method for correcting errors in track counting during seeks of a servo head across the surface of a disc of a hard disc drive that will enable the seeks to be performed in a minimum time.

Another object of the invention is to minimize the time required for performing seeks of a servo head across the surface of a disc of a hard disc drive while limiting the time intervals between adjustment of head speed.

Other objects, features and advantages of the present invention will become apparent from the following detailed description when read in conjunction with the drawings and appended claims.

DESCRIPTION OF THE PREFERRED EMBODIMENT

Figure 1:
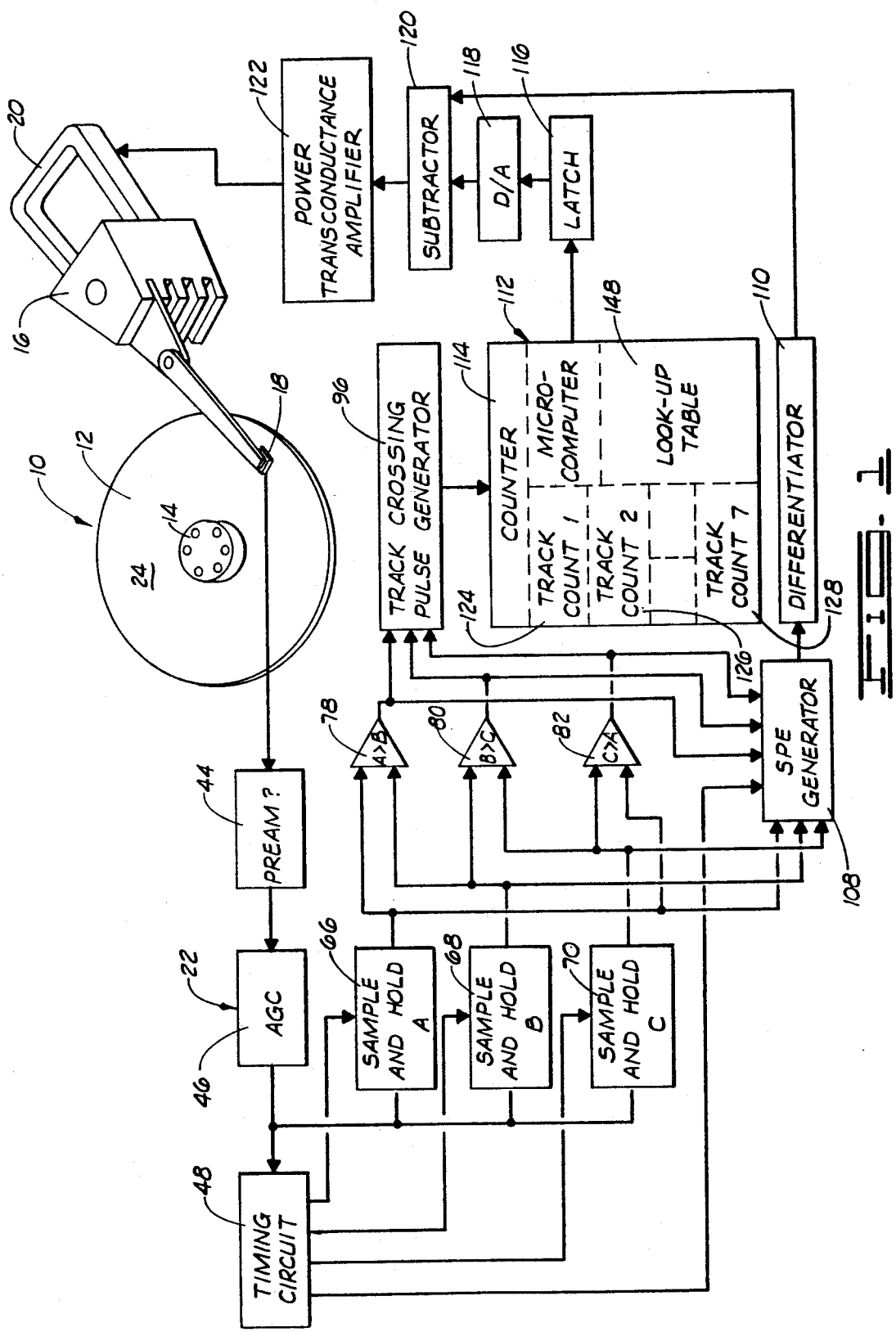
FIG. 1 is a schematic representation of a hard disc drive in which the method of the present invention might be practiced.

In order to provide a full appreciation of the method of the present invention, it will be useful to first consider a hard disc drive in which the method might be practiced and the manner in which seeks to target tracks on discs of a hard disc drive are carried out. Similarly, it will be useful to consider a specific example of the practice of the inventive method. It will, of course, be recognized that neither the specific form of the hard disc drive that has been illustrated in the drawings nor the example are limiting. Rather, it is contemplated that the method of the present invention can be practiced in many hard disc drives and that the example represents only one of many specific modes of operation a hard disc drive might undergo in the practice of the method. Thus, a particular construction for the hard disc drive and a specific example of the operation of such hard disc drive in the practice of the method are presented in the interest of clarity but are not to be deemed as in any way limiting the scope of the invention as recited in the claims appended hereto.

Referring first to FIG. 1, shown therein and designated by the general reference numeral 10 is a schematic representation of a typical hard disc drive. The hard disc drive 10 is comprised of a plurality of discs, one of which has been illustrated and designated by the reference 12, that are mounted on a spindle 14 for rotation, about the spindle axis, by an electric motor (not shown). A pivotable actuator 16 supports a plurality of magnetic transducer heads, one of which has been illustrated in FIG. 1 and designated 18 therein, in close proximity to the surfaces of the discs and the transducer heads can be moved radially across the discs by pivoting the actuator 16. More specifically, a coil 20 mounted on one end of the actuator 16 is immersed in a magnetic field provided by permanents magnets (not shown) positioned about the coil so that forces can be exerted on the actuator 16 by passing a current through the coil 20. A servo circuit, generally designated 22, is provided to adjust this current so that the actuator 16 can be pivoted at a selectable rate to accelerate and decelerate the transducer heads 18 across the discs 12 in a controlled manner.

The surfaces of the discs 12 are provided with magnetizable coatings and, for purposes of example, it will be considered herein that the upper surface of the disc 12 that has been illustrated is a dedicated servo surface 24 to which a servo pattern has been magnetically written for reading by the transducer head 18, referred to hereinafter as the servo head 18, to provide servo head locations signals to the servo circuit 22. An example of such a servo pattern has been shown in FIG. 2 to which attention is now invited.

Figure 2:
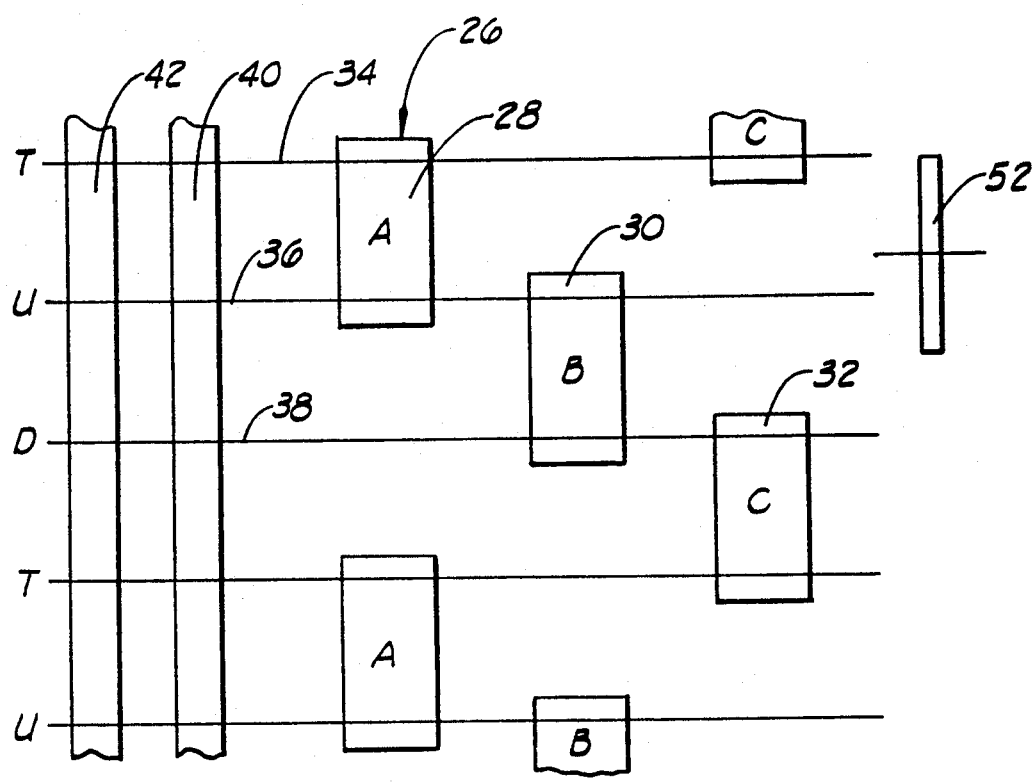
FIG. 2 is illustrates one frame of a servo pattern in one type of hard disc drive.

FIG. 2 illustrates the magnetization of a portion of the servo surface 24 that is described in the aforementioned U.S. Pat. No. 4,811,135 to Janz and, more specifically, FIG. 2 illustrates a servo frame, generally designated 26, that is written to the surface. As is known in the art, the servo frames are written to the surface by magnetizing elements of the frame in one tangential direction while magnetizing remaining portions of the surface in the opposite tangential direction. Thus, changes in the magnetization of the surface occur along radially extending lines and will induce an emf in the servo head 18 each time the edge of a servo pattern element passes under the servo head during the rotation of the disc 12. In the servo pattern described by Janz and reproduced in FIG. 2, each frame is comprised of three dibits, an A dibit 28, a B dibit 30 and a C dibit 32, that are spaced radially to define a series of concentric servo tracks and longitudinally to permit sequential reading of edges of the dibits. More specifically, the radial spacing of the dibits and repetition of the frames radially across the disc define a repeating series of T, U and D servo tracks, such as the tracks 34, 36 and 38 in FIG. 2, that extend radially across the active region of the disc. Each frame is further comprised of three sync dibits and, with an exception noted in the aforementioned Janz patent, three code dibits that form radially extending magnetized regions 40, for the sync dibits, and 42, for the code dibits. The frames are repeated longitudinally so the the servo tracks extend in a circle about the center of the disc.

Returning to FIG. 1 and with continuing reference to FIG. 2, signals induced in the servo head 18 by passage of a dibit edge are transmitted, via a preamplifier 44 and AGC circuit 46 to a conventional timing circuit 48 that is constructed to recognize the temporal spacing of these signals and establish a servo clock that correlates locations in the servo frame 26 with clock pulses generated within the timing circuit 48. Thus, the timing circuit 48 enables pulses corresponding to specific servo pattern dibit edges to be picked from the emf induced in the servo head 18 by passage of the dibits by the servo head 18 and such selection is utilized in locating the servo head 18 in relation to the servo tracks on the disk surface 24 as will now be discussed with further reference to FIGS. 3 and 4.

Figure 3:
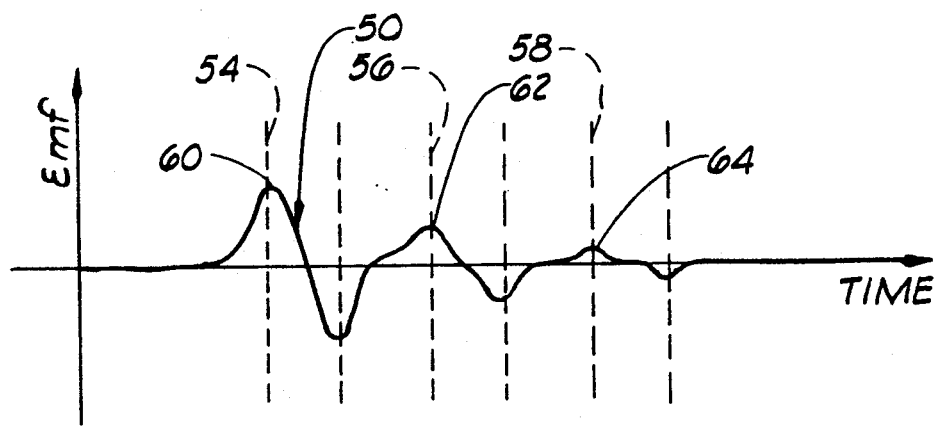
FIG. 3 is a graph of emf induced in the servo head as the frame shown in FIG. 3 passes under the servo head for one radial location of the servo head.

The curve 50 in FIG. 3 is a graphical representation of the emf induced in the servo head 18 during passage of the frame 26 by the servo head 18 for the location of the servo head that has been indicated by a depiction of the flux gap in the servo head shown at 52 in FIG. 2. As will be clear from the position of the flux gap 52 in such drawing, unequal widths of the A, B and C dibit edges will pass by the flux gap so that the maximum change in magnetic flux that will be seen by the servo head 18 will depend upon the radial location of the servo head 18 on the disc 14. Thus, the emf curve 50 will exhibit a series of peaks that correspond to passage of specific dibit edges and have amplitudes that are a measure of the location of the servo head 18 within a particular servo frame. More specifically, as shown in FIG. 3, the leading edges of the A, B, and C dibits, indicated by dashed lines 54, 56 and 58 respectively, will give rise to emf peaks indicated at 60, 62 and 64 respectively. These peaks are transmitted to A, B, and C sample and hold circuits 66, 68, and 70 that receive timing signals from the timing circuit 48 to cause the amplitudes of the peaks 60, 62 and 64 to be temporarily stored after the A, B, and C dibits pass the servo head. These stored amplitudes are used to determine the actual velocity of the servo head 18 across the disc surface 24 in a manner to be discussed below.

Figure 4:
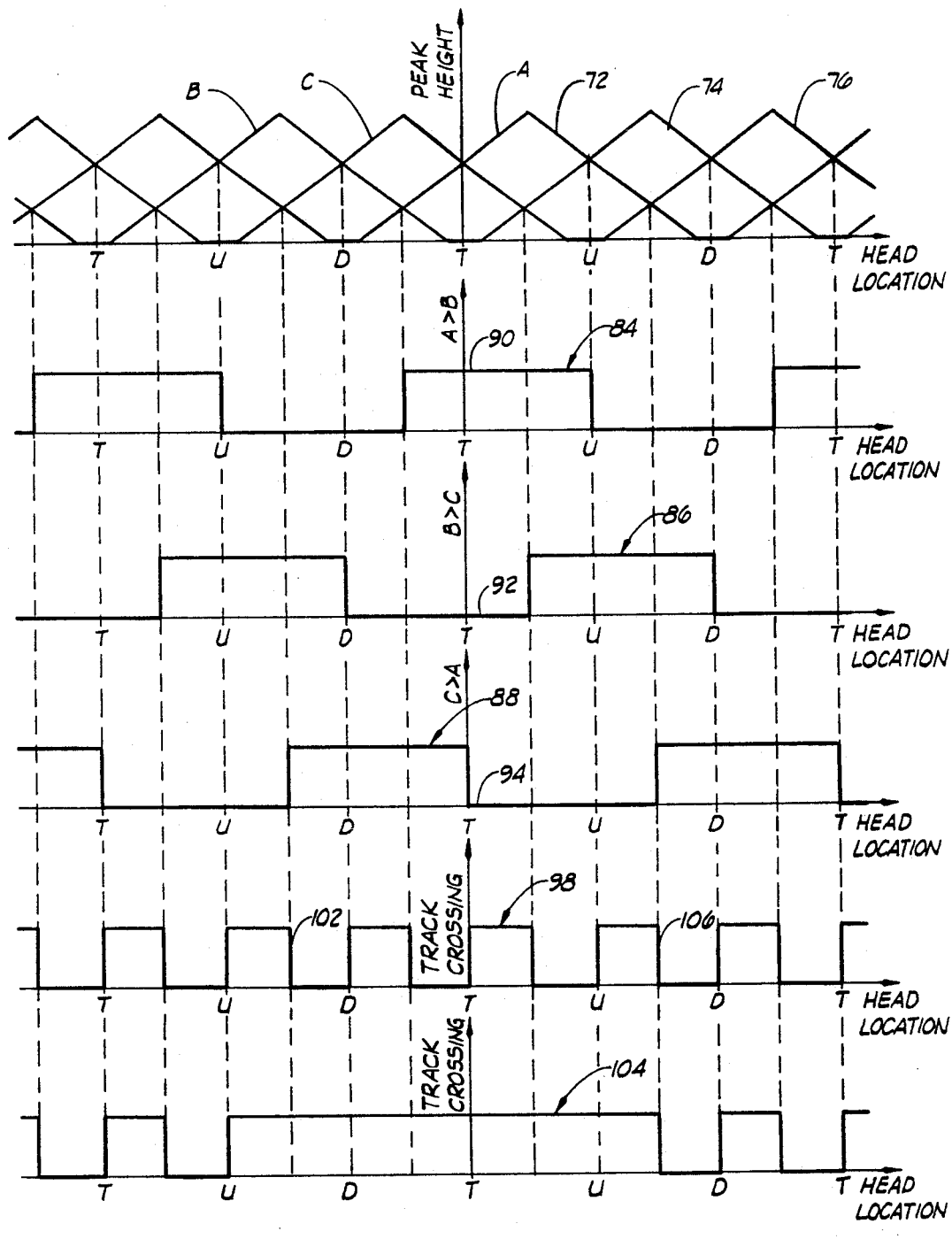
FIG. 4 is a set of graphs illustrating the generation of track crossing pulses during a seek by the servo head to a target track.

As will be clear from the above discussion, the amplitudes of the emf peaks 60, 62 and 64 will vary as the servo head 18 is moved radially across the disc surface 24 and such variations will ideally have the form that has been illustrated by the curves 72, 74 and 76, for the peaks 60, 62 and 64 respectively, in the uppermost graph in FIG. 4 wherein the amplitudes of the emfs induced in the servo head 18 by passage of A, B and C dibits respectively have been plotted against servo head location. In general, each of these curves 72, 74 and 76 will exhibit rising straight line portions that are approximately centered on one of the T, U and D tracks followed by a dropping straight line portion approximately centered on the next of the T, U and D tracks. Moreover, each pair of the curves 72, 74, and 76 will intersect at one of the T, U, and D tracks and at the midpoint between the other two track types. Thus, for example, the curves 72 and 76, corresponding to the A and C dibits intersect at each T track and midway between each pair of U and D tracks.

Returning to FIG. 2, the outputs of the sample and hold circuits 66, 68 and 70 are transmitted to three comparators 78, 80 and 82 with each comparator being connected to one pair of the sample and hold circuits 66, 68 and 70 to provide comparisons of the peak heights 60, 62 and 64 once during the passage of each servo frame by the servo head. The results of the comparisons have been illustrated for the comparators 78, 80, and 82 respectively, as a function of servo head location, at 84, 86 and 88 in FIG. 4. As can be seen from these curves, the outputs of the comparators 78, 80 and 82 define six servo states corresponding to six half track space wide ranges of location of the servo head 18 in the servo frame. Thus, for a location of the servo head 18 between a T track and the midpoint of such T track and the adjacent U track, the output of comparator 7B will be high, as indicated at 90 in FIG. 4, and the outputs of comparators 80 and 82 will both be low, as indicated at 92 and 94 respectively to define a servo state 100 Because of the repetitive placement of the A, B and C dibits, these states repeat in a specific order as the servo head 18 is moved radially inwardly or outwardly across the disc surface 24.

The outputs of the comparators 78, 80, and 82 are connected to a conventional track crossing pulse generator 96 whose ideal operation has been illustrated by the graph 98 in FIG. 4 which illustrates the ideal output of the track crossing pulse generator 96 as a function of servo head location. As shown by this graph, the output of the track crossing pulse generator 96 rises as the servo head 18 crosses a track and falls at a point halfway between two adjacent tracks. In the practice of the present invention, it is contemplated that the track crossing pulse generator 96 will be a sequential state machine of the type whose output can change only if the next servo state received at its inputs is the state that will follow the current state for movement of the servo head 18 radially across the disc surface 24. Thus, for example, if the servo head is moving radially inwardly and the current state of the servo system is 110, corresponding to the location of the center of the flux gap 52 between the midpoint of the spacing between a T track and a U track and the U track, the output of the track crossing pulse generator 96 will change only when it senses the state 010 that occurs when the center of the flux gap passes the U track. Such track crossing pulse generators are commonly used to prevent noise in the servo circuit 22 from giving rise to spurious track crossing pulses during seeks of the servo head 18 from one track to a selected target track.

The curve 98 is ideal in several respects. As will be clear from the above discussion of the generation of the comparator outputs, these outputs will change once for the passage of a servo frame by the servo head 18. That is, the location of the servo head is sampled at regular intervals so that the rising and falling edges of the curve 98 will generally not occur at the track centers and midpoints between track centers. Instead, these edges occur at locations of the servo head for which the emf pulses induced in the servo head are sampled. Thus, in view of the sequential state recognition characteristics of the track crossing pulse generator 96, such generator, in effect "hunts" for the next expected state each time it has received a particular state. At low servo head speeds, many samples are taken between any two tracks so that it is highly unlikely that the succeeding state will be missed. On the other hand, at high servo head speeds, only a few state samples are taken between any two tracks with the result that defects in the magnetized coating of the disc 14 or in the magnetization of the dibits and noise can cause a change of state to be missed. The result is that the track crossing pulse generator 96 will lock up in the current state to miss passage of the servo head 18 by three servo tracks. Such lock up has been illustrated in the lowermost curve 100 in FIG. 4 which illustrates the output of the track crossing pulse generator 96 for the case in which the transition between a 010 state and a 011 state, as indicated by the falling edge 102 for graph 98 has been missed. In this case, the output of the track crossing pulse generator 96 will remain high until three tracks have been crossed to again give rise to a transition from a 010 state to a 011 state as indicated by the falling edge 106 of the curve 98. The significance of this lock-up of the track crossing pulse generator will become clear below.

Returning to FIG. 1, the outputs of the sample and hold circuits 66, 68 and 70 are also transmitted to a conventional servo position error (SPE) generator 108 which is clocked by the timing circuit 48 to generate a signal indicative of the location of the servo head 18 with respect to the nearest servo track. To this end, the outputs of the comparators 78, 80 and 82 are provided to the SPE generator 108 and utilized thereby to select one of the curves 72, 74 and 76 in the uppermost graph of FIG. 4 and output the amplitude of the corresponding emf induced in the servo head 18. This output is differentiated by a conventional differentiator 110 whose output is thus the speed of the servo head across the disc surface 24.

With this background, it is now possible to consider the manner in which a seek to a target track is made and the problem that has given rise to the present invention. The servo system is comprised of a microcomputer 112 in which is stored a velocity demand profile that specifies the velocity the servo head is to have in relation to the number of tracks remaining in the seek and the number of tracks to the target track from the current servo head location is placed in an integral tracks-to-go counter 114 at the commencement of the seek. The clock input of the tracks-to-go counter receives the output of the track crossing pulse generator 96 so that, as the servo head is moved toward the target track, falling edges of pulses generated by the track crossing pulse generator 96 count down the number of tracks remaining in the seek for any current location of the servo head 18. The microcomputer 112 is programmed to read the tracks-to-go counter 114 during each of a sequence of equal time intervals, that are of the order of 10 to 15 times the sampling time at which the sample and hold circuits 66, 68 and 70 are updated, look up the velocity the servo head should have for the number of tracks remaining in the seek from the velocity demand profile and output a digital representation of such velocity to a latch 116. The output of the latch 116 is transmitted to a D/A converter 118 to provide an analog signal proportional to the demand velocity to one input of a subtractor 120. The other input of the subtractor 120 is connected to the output of the differentiator 110 so that the output of the subtractor will be proportional to the difference between the demand velocity and the actual velocity of the servo head 18. This difference is transmitted to a power transconductance amplifier 122 which passes a current through the coil 20 of the actuator 16 in proportion to the difference between these two velocities. Thus, the servo head 18 is accelerated and subsequently decelerated across the disc 14 substantially in proportion to the difference between the velocity it should have at its present location for a seek in accordance with the velocity demand profile and its actual velocity. The seek is terminated when the the tracks-to-go counter reaches zero.

It will be noted that, since the demand velocity is outputted to the latch 116 at set time intervals, rather than continuously, it is desirable that the duration of these time intervals be limited. If the durations of the time intervals are excessive, the servo head 18 will move a relatively large distance during each interval to result in a large difference between the actual head velocity and the demand velocity at the beginning of the next time interval. In such a case, the actual velocity will oscillate about the demand velocity and such oscillation can give rise to increased times for settling the servo head 18 on the target track once such track has been reached.

For this mode of target track seeking to bring the servo head 18 to the target track at the end of the seek, it is essential that no track crossings be missed by the track crossing pulse generator 96. Should a group of three track crossings be missed, the tracks-to-go counter will not count down to zero at the target track but at a track that is three tracks beyond the target track. When this occurs, time is required both for the seek error to be detected and subsequently, corrected. As is known in the art, data is written to data disks that are formatted in addressed sectors so that seek errors can be detected by a failure of circuitry that reads and writes data to find the sector to which reading or writing is to occur once the seek has been completed. Thus, the time required to detect the seek error is at least the time required for all addresses on a data track to pass a read/write head; that is, the time for the disk 14 to rotate once. Once detected, the error must then be corrected by moving the servo head to a known radial location on the disc 14 and then seeking the target track from that location. Generally, such location is the outermost track, referred to as track zero, on the disc. The time required for this remedial action can greatly exceed user specifications for hard disc drives.

Figure 5:
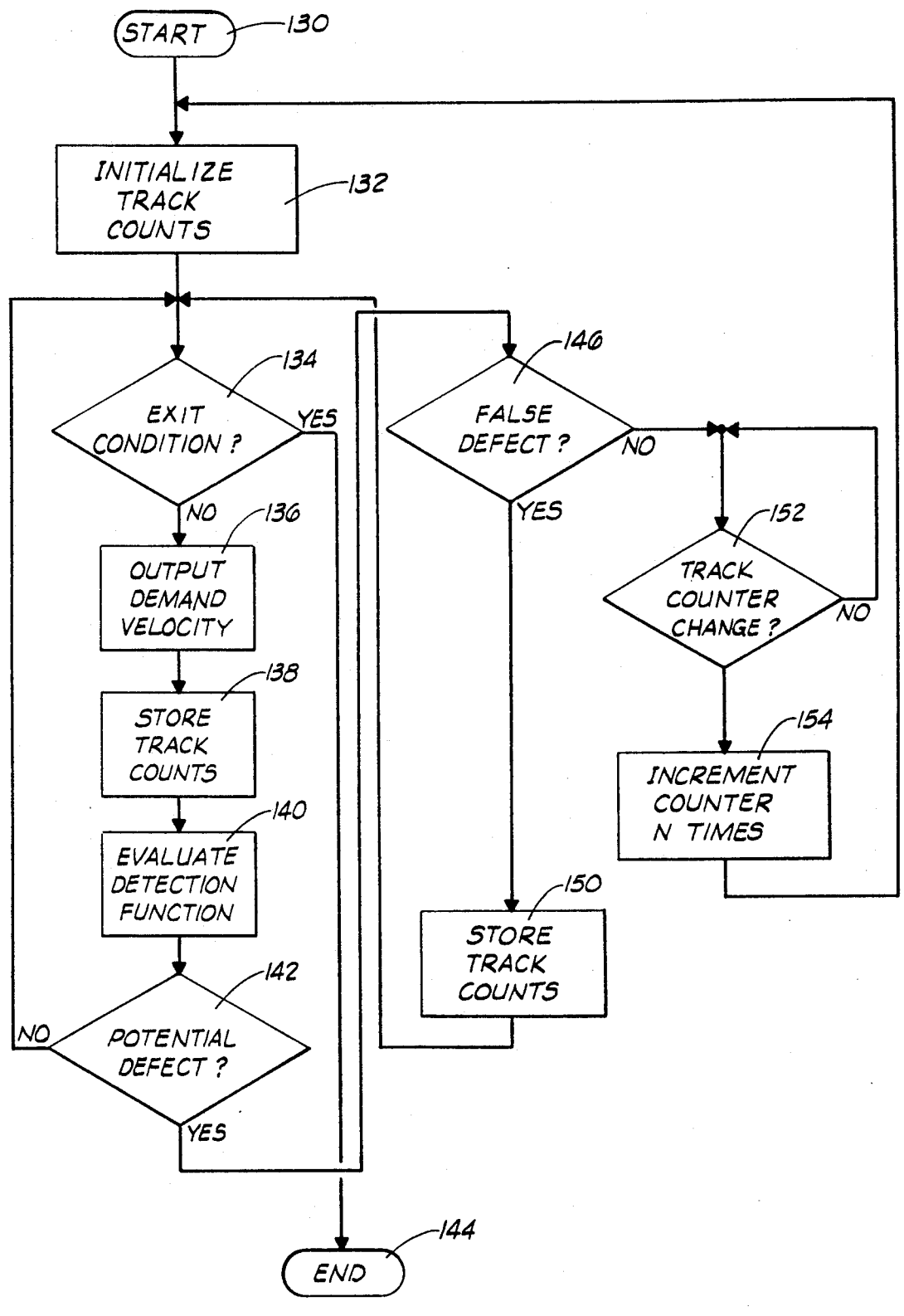
FIG. 5 is a flow chart illustrating the inventive method for correcting track counting errors during a seek by the servo head to a target track.

Referring now to FIG. 5, shown therein is a seek routine that incorporates the method for correcting counting errors during seeks in accordance with the present invention. In the practice of the inventive method, a plurality of memory locations in the microcomputer 112 are reserved for storing a sequence of track counts and, for purposes of providing a concrete example, it will be assumed that seven such locations are so reserved. Three of these memory locations have been indicated and given the numerical designations 124, 126 and 128 in FIG. 1. The quantities to be stored in these memory locations are indicative of successive values in the tracks-to-go counter 114 during a seek and are preferably a selected number of least significant bits of such values. It is contemplated that these memory locations will be updated at a rate that will be reflected in only a limited number of tracks-to-go counter bits so that only a portion of the tracks-to-go counter contents needs to be used as track counts that are indicative of a succession of servo head locations. These track counts will be referred to herein as TC1 through TC7, for the example under consideration, and the meaning of the number suffixes will be made clear below.

Returning to FIG. 5, following the initiation of a seek, as indicated by the start block 130, the tracks-to-go counter is initialized with the number of tracks to the target track and, concurrently, such number is entered, at the initialize track count block 132 as the values of TC1 through TC7 in the reserved memory locations in the microcomputer 112. The routine then enters a loop indicated by the blocks 134, 136, 138, 140 and 142 to be described below. An important feature of the invention is that the programming of the microcomputer 112 will be such that the total time required for the execution of this loop will have a specific value so that all loops are carried out in precisely the same time. Moreover, each step of the loop is carried out at a particular time following the commencement of the execution of the loop.

The initial two steps of the loop are associated with the conduct of the seek, rather than the inventive method, and may vary from one loop to another. Thus, the two steps 134 and 136 are representative of steps that might be executed in the seek routine but are not, per se, steps that are associated with the inventive method For purposes of example, the steps 134 and 136 have been selected to illustrate portions of a seek that occur after the servo head 18 has reached the maximum speed it is to achieve during the seek. For this example, the step 134 is a decision block that provides for the exit, end block 144, from the seek routine during terminal portions of the seek. Such exit will be effected during the deceleration of the servo head 18 when the speed of the servo head has dropped to a value for which counting errors occur so rarely as to be substantially non-existent. Since, as discussed above, the seek is carried out in accordance with a velocity demand profile relating demand velocity to the number of tracks remaining in the seek, such exit condition can be implemented by reading the contents of the tracks-to-go counter 114 and exiting the routine when such contents falls to a selected value. Following the exit condition check, the demand velocity corresponding to the current number of tracks remaining in the seek is outputted, block 136, to the latch 116 and steps for correcting track counting errors commences.

In the block 138, the track count TC1, derived from the tracks-to-go counter is entered into the memory location reserved for TC1 and the previous contents of the memory locations reserved for TC1 through TC6 are shifted into the locations reserved for TC2 through TC7 respectively. Thus, following the execution of the store track counts block 138, a sequence of track counts will be stored with each track count being a number representative of the count in the tracks-to-go counter for a succession of time intervals equal to the time required for the execution of the loop.

In the evaluate detection function block 140 that follows, the track counts are used to establish a first criterion for the detection of a track counting error in the two most recent track counts that have been stored. In the example in which seven track counts have been stored, such first criterion is the value for a detection function defined as $$F = 2(TC1 - TC3) - (TC3 - TC7)$$

and it will be useful, before continuing with FIG. 5 to consider the physical meaning of this detection function.

Initially, since each loop is executed in the same time and since the track counts are indicative of the tracks-to-go counter contents at a specific time in the loop, the quantity $(TC1-TC3)$ will be proportional to the average velocity of the servo head 18 over the most recent two loops. Similarly, the quantity $(TC3-TC7)$ will be the average velocity of the servo head 18 over the previous four loops. Thus, if the servo head 18 is moving at constant speed, the first term in the detection function is, in effect, four times this velocity because of the coefficient 2 before the term and the difference in non-consecutive track counts in the term. Similarly, the second term will be, in effect, four times such constant velocity because of the inclusion of four track count differences in such term. Thus, if the servo head is moving at constant speed and no counting errors occur, the value of the detection function will, ideally, be zero. However, as noted above, the location of the servo head 18 is sampled at fixed time intervals required for passage of one servo frame past the servo head 18. Moreover, the tracks-to-go counter is sampled at a lower rate which need not be synchronized with the frame sampling rate so that a change in the servo state may contribute to one track count during one sequence of loop time intervals and to the next track count for another sequence. Thus, for constant speed movement of the servo head 18, the value of the detection function will exhibit a small range about the value zero. For acceleration of the servo head 18, the term $(TC1-TC3)$ will be increased in relation to the term $(TC3-TC7)$ to extend the upper end of this range for the detection function while, for deceleration of the servo head 18 the term (TC1−TC3) will be decreased in relation to the term (TC3−TC7) to extend the lower end of the range. However, in any event, the possible values for the detection function will, in the absence of a track counting error, lie within a specific range. For purposes of example, it will be assumed that this range is given by:

$$-4 \leq F \leq 2$$

If the speed of the servo head is high enough to cause a track counting error, then, as discussed above, three track crossing pulses will not be generated for the example at hand; that is, a servo system having a tri-phase servo pattern. (As noted above, the invention is not limited to the specific example used to provide a description of the invention. Thus, it is contemplated that a different number of track crossing pulses might be missed within the scope of the invention.) In the practice of the invention, the loop time is selected so that these missing track crossing pulses will occur in two loop times for servo head speeds that are high enough to give rise to track counting errors. In this case, the term 2(TC1−TC3) must be decreased by six since all three of the missing track crossing pulses must occur in one loop time interval or the next. Thus, if a state transition is missed by the track crossing pulse generator 96, the range of values of the detection function will become $$-8 \leq F \leq -4$$

for at least one of the sequence of loop time intervals.

As will be clear from this example, the first criterion for detection of a counting error will, in many cases not provide an unambiguous determination that a track counting error has occurred. Specifically, in the example, the value $F = -4$ is ambiguous; it could be the low extreme for the error free range or the high extreme for the the case in which a counting error has occurred.

While the ambiguity might be resolved by using a different detection function, the present invention contemplates that the ambiguity be accepted in order that the loop time interval be maintained as short as possible. Specifically, the resolution of the ambiguity would require a larger number of track counts in order to extend the detection function without introducing new ambiguities into the range of such function by unequal weighting of the track count differences in the detection function. Thus, the invention specifically contemplates that the detection function will be selected to provide an ambiguous first criterion which, in the example at hand, is that a potential counting error has occurred for a value of the detection function less than −3. The presence or absence of such a potential defect is determined at the block 142 in FIG. 5. In the absence of a potential defect, as determined by the first criterion that the detection function be less than a selected value, the routine returns to the block 134 to commence another loop.

When a potential counting error is detected, a second criterion, applied in a time equal to the loop time interval, is used to resolve the ambiguity. Specifically, the microcomputer 112 is programmed to execute a false defect decision block 146 and the programming of the microcomputer is specifically written so that the time required for the execution of the false defect decision block 146 is the same time as the time required for the execution of the blocks 134 and 136 of the loop. In the false defect decision step, a second criterion is applied to determine whether the ambiguous value for the detection function is the lower extreme of the normal range of detection function values; that is a false error detection, or the maximum value for the case in which a counting error has occurred.

To this end, a look-up table, indicated at 148 in FIG. 1, is stored in a portion of the microcomputer 112 memory to contain a set of track count difference patterns as will now be described. Initially, it has been found that the extreme values for the detection function occur only rarely in relation to other values and, moreover, the lowest value in the range will occur, in the absence of a track counting error, for only a certain sets of values of track counts that are grouped in accordance with patterns in the differences between successive track counts and for specific numbers of tracks remaining in the seek. Thus, if such differences are defined by D1=TC6−TC7, D2=TC5−TC6, D3=TC4 −TC5, D4=TC3−TC4, D5=TC2−TC3 and D6=TC1−TC2, false counting error detections can occur only for a limited number of such patterns. An example is presented in Table I for the case in which the ambiguity in the value of the detection function is −4.

TABLE I

| D1 | D2 | D3 | D4 | D5 | D6 | Tracks Remaining |
|----|----|----|----|----|----|------------------|
| 5  | 4  | 4  | 5  | 4  | 3  | Any Number       |
| 5  | 4  | 4  | 5  | 3  | 4  | Any Number       |
| 4  | 4  | 4  | 4  | 3  | 3  | 190 or fewer     |
| 5  | 3  | 4  | 4  | 3  | 3  | 190 or fewer     |
| 4  | 3  | 3  | 4  | 3  | 2  | 160 or fewer     |
| 4  | 3  | 3  | 4  | 2  | 3  | 160 or fewer     |
| 4  | 3  | 4  | 3  | 3  | 2  | 160 or fewer     |
| 4  | 3  | 4  | 3  | 2  | 3  | 160 or fewer     |

As will be clear from the brevity of this table, very little microcomputer memory and little execution time is required to determine whether a false error detection has occurred. Accordingly, the method of the present invention contemplates that false counting error detections; that is, potential error detections that represent the extreme lower value for the detection function in the absence of a counting error, be eliminated by applying a second criterion. Specifically, the second criterion is that a false error detection is defined as a potential error detection for which the pattern of differences is found, in relation to the number of tracks remaining in a seek, in the look-up table 148. The manner in which the values to be entered in the look-up table 148 are determined will be discussed below.

Continuing with FIG. 5, following the determination that a potential counting error detection is a false error detection; that is, the track difference pattern for the current values of the track counts is a member of the set of values stored in the look-up table 148 for the present location of the servo head, a new track count is entered as TC1 from the tracks to-go-counter 114 and the previously stored contents of the memory locations reserved for TC1 through TC6 are shifted, as in the step 140, at a store track counts step 150 to become current track counts TC2 through TC7. As noted above, the time required for the execution of the false defect decision block 146 is the same as the time required for the execution of the blocks 134 and 136 so that such storage will occur, in the time interval following the detection of the potential counting error, at the time such storage is effected within each of the loops executed in the absence of the detection of a potential counting error.

Similarly, the storage block 150 is written to be executed in the same time that the storage step 138, the detection function evaluation step 140 and the potential defect detection step 142 are executed so that one loop time interval is required to determine whether a false defect has been detected and, if so, to store the track counts for the time interval in which this second criterion has been applied. Following the determination that the potential counting error was a false error detection, the microcomputer 112 returns to the loop at step 134 with track count values appropriate to the current location of the servo head.

If the potential counting error is not a false error detection; i.e., the difference pattern is not in the look-up table 148, the decision block 146 proceeds to a branch in which the counting error is corrected and the execution of the routine is re-initiated. Specifically, following the determination that the potential error is an true counting error, a subloop is entered at decision block 152 in which the tracks-to-go counter is repetitively read and successive readings compared to detect a change in the value therein. Such detection maximizes the time in which the counter contents can be changed without interfering with the reception of track crossing pulses generated by the track crossing pulse generator 96. Thereafter, the tracks-to-go counter is incremented, at block 154, by the microcomputer 112 a number of times that is equal to the number of missing track crossing pulses that occur between successive identical servo system state transitions. Thus, in the example at hard in which the servo system employs a tri-phase servo pattern, so that missing track crossing pulses occur in groups of three, the tracks-to-go counter 114 would be incremented three times. The routine then returns to the intialization step 132 for repetitions of the track counting error correction method and such repetition is continued until the condition for exit from the method is detected at step 134.

The determination of the track count difference patterns that will yield false error detections can be readily determined by replacing a ROM chip forming the program memory of the microcomputer with a ROM chip containing a special program. Such program permits the microcomputer to carry out all functions that would be carried out in a hard disc drive in the field and, additionally, provides for saving the track counts that will yield a potential track count error in unused portions of the microcomputer RAM. For each of these potential track count errors, the special program includes instructions for incrementing the tracks-to-go counter. With such ROM chip in place, a computer is connected to the hard disc drive through the interface provided for the storage of data and is programmed to repeatedly call for seeks of random length. At the end of each seek, the addresses on a data track corresponding to the servo track to which the seek is made are read to determine whether the seek has ended with the target track. If not, the stored track counts have occurred for a false error detection. Further, the microcomputer is programmed to report to the computer connected to the drive interface that the servo head has reached a track other than the target track and, upon further query, to transfer the track counts that were stored at the time of the correction to such computer. These track counts are stored for later printout. Thus, by carrying out a large number of seeks of random length, the track count differences corresponding to the false error detections are determined.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a hard disk drive servo system including a rotating disc having a magnetizable servo surface whereon a servo pattern defining a plurality of concentric servo tracks is magnetically recorded, a servo head adjacent the servo surface for reading the servo surface and generating servo signals indicative of the radial location of the servo head in response to passage of portions of the servo pattern by the servo head, means for moving the servo head radially across the disc surface in a seek from one servo track to another servo track, and counting means, including a counter, electrically connected to the servo head and responsive to the servo signals generated during a seek for maintaining a count in said counter indicative of the number of tracks remaining in the seek, a method for correcting errors in the counting of tracks remaining in the seek comprising the steps of:
(a) storing at least a portion of the counter contents during each of a sequence of equal time intervals, wherein each of the stored portions of the counter contents are stored for a selected number of said time intervals to maintain a plurality of consecutive track counts during each of said time intervals;
(b) applying a preselected first criterion to the stored track counts during each of said time intervals to detect potential track count errors, wherein the first criterion is selected to yield a false error detections for values of the track counts that satisfy a predetermined second criterion;
(c) returning to step (a) in the event that no potential track count error is detected;
(d) for each potential track count error, applying the second criterion to detect false error detections;
(d) returning to step (a) for a false error detection; and
(e) incrementing the counter contents by a preselected amount and returning to step (a) for potential error detections other that false error detections.

2. The method of claim 1 wherein the first criterion is that a preselected function of track count values is less than a predetermined number.

3. The method of claim 2 wherein seven track counts are stored, said track counts indicated by TC1 through TC7 for the most recently stored counter contents portion through the earliest stored counter contents portion respectively and wherein said function is $$F = 2(TC1 - TC3) - (TC3 - TC7).$$

4. The method of claim 2 wherein the second criterion is that the pattern of differences between successive track counts for each of a plurality of ranges of numbers of tracks remaining in the seek is one of a selected set of numbers specific to each range.

* * * * *

UNITED STATES PATENT AND TRADEMARK OFFICE
CERTIFICATE OF CORRECTION

PATENT NO.   : 5,233,486
DATED        : August 3, 1993
INVENTOR(S)  : Glenn D. Albert It is certified that error appears in the above-indentified patent and that said Letters Patent is hereby corrected as shown below:

Column 6, line 58, delete "7B" and substitute therefor --78--;

Column 6, line 61, after "100" insert a period --.--;

Column 9, line 61, after "method" insert a period --.--; and

Column 13, line 30, delete "hard" and substitute therefor --hand--.

Signed and Sealed this

Eleventh Day of October, 1994

Attest:

BRUCE LEHMAN

Attesting Officer

*Commissioner of Patents and Trademarks*